United States Patent

Asano et al.

[19]

[11] Patent Number: 5,905,965
[45] Date of Patent: May 18, 1999

[54] RADIO COMMUNICATION APPARATUS WHICH INCLUDES A BASE STATION AND TERMINALS THAT SAVE POWER AS THEY MONITOR FOR INCOMING CALLS FROM THE BASE STATION

[75] Inventors: Nobuo Asano; Osamu Kato, both of Yokohama, Japan

[73] Assignee: Matsushita Electric Industrial Co., Ltd., Osaka, Japan

[21] Appl. No.: 08/272,157

[22] Filed: Jul. 8, 1994

[30] Foreign Application Priority Data

Jul. 16, 1993 [JP] Japan .................................. 5-199016

[51] Int. Cl.⁶ ...................................................... H04Q 7/32
[52] U.S. Cl. ........................ 455/574; 455/38.3; 455/343; 370/311
[58] Field of Search .................................... 455/343, 227, 455/228, 38.1, 38.2, 38.3, 57.1, 517, 556, 572, 574; 370/93, 94.2, 311

[56] References Cited

U.S. PATENT DOCUMENTS

| | | | |
|---|---|---|---|
| 4,901,307 | 2/1990 | Gilhousen et al. | 370/18 |
| 4,996,526 | 2/1991 | DeLuca | 455/343 X |
| 5,204,656 | 4/1993 | Scheinert | 455/373 X |
| 5,420,911 | 5/1995 | Dahlin et al. | 455/574 X |
| 5,537,097 | 7/1996 | Eriksson et al. | 455/38.3 X |

*Primary Examiner*—Wellington Chin
*Assistant Examiner*—Philip J. Sobutka
*Attorney, Agent, or Firm*—Venable; Robert J. Frank; Allen Wood

[57] ABSTRACT

A base station includes an incoming call terminal identification message generating portion When the base station transmits an incoming call message to a terminal, an incoming call terminal identification message useful for only the incoming call terminal, for example a message such as ID number information peculiar to the terminal, is inserted in the head of a slot assigned to the terminal and is transmitted. When the incoming call terminal detects the incoming call terminal identification message, the terminal receives a regular incoming call message transmitted thereafter. When the terminal cannot detect the incoming call terminal identification message, the terminal judges that the message is not directed to a call to its own terminal and immediately stops monitoring of the slot at this time.

2 Claims, 8 Drawing Sheets

RADIO COMMUNICATION APPARATUS WHICH INCLUDES A BASE STATION AND TERMINALS THAT SAVE POWER AS THEY MONITOR FOR INCOMING CALLS FROM THE BASE STATION

BACKGROUND OF THE INVENTION

1. Field of the Invention

The present invention relates to a radio communication apparatus such as a mobile telephone and a portable telephone including a battery as a power supply thereof.

2. Description of the Related Art

In a radio communication system including a base station and terminals, control information such as information for controlling a call may be transmitted through a control channel and speech maybe transmitted through a speech channel. When there is an incoming call from the base station, information for call initiation for calling a specific terminal is generally transmitted through the control channel. The terminal detects the information for call initiation and exchanges necessary information with the base station. Then, the terminal starts speech by means of the speech channel. The terminal is required to monitor the control channel in order to detect the call initiation; the terminal does not always monitor for an incoming call, but monitors for an incoming call for a particular time at regular intervals. The state of monitoring for a request for call initiation is named a state of waiting for a call. Thus, in this state, the terminal operates a receiving circuit only when the terminal performs the monitoring and during other periods the terminal is required to operate a timer function for counting the time until the next monitoring at the minimum.

FIG. 1 is a block diagram schematically illustrating a control channel transmitting unit of a base station and a control channel receiving unit of a terminal in the prior art. In the base station 51, an incoming call control portion 53 detects an incoming call from a network. An incoming call message generating portion 54 generates an incoming call message for the incoming call terminal. An other message generating portion 55 generates messages of various kinds of control information indicative of states and the like of the system which are not directly related to the incoming call. A message constructing portion 56 constructs messages from the incoming call message generating portion 54 and the other message generating portion 55 to form one message block. A transmitting portion 57 transmits the message block constructed by the message constructing portion 56 in synchronism with a slot timing through radio.

In a terminal 52, which is a mobile station, a receiving portion 58 monitors a slot assigned to the terminal 52 and receives a radio wave signal from the base station 51. An incoming call message detecting portion 59 takes out the incoming call message from the received slot. An operation/stop control portion 60 controls to operate and stop each portion of the terminal Operation of the above prior art will now be described Control data transmitted from the base station 51 is described with reference to FIG. 2. In FIG. 2, a carrier 61 used as the control channel on a radio circuit is divided into slots each having a milliseconds as a unit. A control message 62 provided on the control channel includes a series of various kinds of control information containing incoming call information sent from the base station 51 and is formed as one message block. The terminal 52 monitors the control channel for each slot assigned thereto in the state of waiting for a call and previously arranges together with the base station 51 to monitor the control channel every k slots. In FIG. 2, for example, when the terminal 52 monitors the control channel at slot (n), the next monitoring by the terminal 52 is performed at slot (n+k). Further, when the base station 51 attempts to connect a call to a terminal, the base station 51 provides the incoming call message in any position within a slot to be monitored by the terminal 52, so that the terminal 52 can detect the request for call initiation. For example, when the incoming call information is provided in the message (3) of the slot (n), the terminal 52 can receive the message (3) including the incoming call information for x milliseconds after an elapse of y milliseconds from starting of monitoring the slot (n).

Referring now to FIGS. 3 and 4, operation of the base station 51 and the terminal 52 will be described. As shown in FIG. 3, in the base station 51, when the incoming call control portion 53 detects an incoming call from a line wire (step 71), the control portion 53 requests the incoming call message generating portion 54 to issue an incoming call message (step 72). The call incoming message generating portion 54 issues the incoming call message in response to the request. The message constructing portion 56 constructs the incoming call message and inserts the message into a specific slot (step 73). The transmitting portion 57 transmits the constructed message through radio (step 74).

On the other hand, in the terminal 52, as shown in FIG. 4, the operation/stop control portion 60 operates the receiving portion 58 and the incoming call message detecting portion 59 just before a slot to be monitored by its own terminal is reached and moves from the state of waiting for a call to an operational state (step 81). The receiving portion 58 receives the slot assigned to its own terminal (step 82) and the incoming call message detecting portion 59 examines whether an incoming call message to its own terminal is contained in the received slot or not (step 83). If an incoming call message to its own terminal is present, the operation/stop control portion 60 sends a signal to an incoming call processing control portion (not shown) to perform the call initiation process. If an incoming call message to its own terminal is not present, the slot is continuously received until the slot is finished (step 84). When the slot is finished, the operation/stop control portion 60 stops operation of the receiving portion 58 and incoming call detecting portion 59 and moves from the operational state to the state of waiting for a call (step 85).

In the conventional radio communication apparatus, however, there is the following problem: Whether an incoming call message to its own terminal is contained to the received slot is not understood unless the slot is received to the end thereof and the message is decoded, and the longer the slot time is, the more a battery in the terminal is consumed.

Generally, in a terminal such as the portable telephone which is operated by a battery, how long the time of waiting for a call can be extended in one charging is a very important subject and the electric power consumed to monitor the slot every time so as to detect an incoming call to the terminal cannot be neglected.

SUMMARY OF THE INVENTION

It is an object of the present invention to solve the problems in the prior art and provide a radio communication apparatus capable of suppressing consumption of a battery in a terminal to lengthen the time of waiting for a call.

In order to achieve the above object, according to the present invention, when a base station transmits an incoming call message to a terminal, the base station inserts a message useful for only the incoming call terminal, for example peculiar numerical information for identifying the terminal, into the head of the slot assigned to the terminal and transmits the message. When the terminal detects the message, the terminal receives a regular incoming call message transmitted thereafter When the terminal cannot detect the message, the terminal immediately stop monitoring of the slot at this time.

According to the present invention, when the incoming call terminal detects the message useful for only the terminal in the head of the received slot, the terminal receives the slot at this time to the end thereof and obtains the regular incoming call information. When the terminal cannot detect the message, the terminal can understand that incoming call information directed to its own terminal is not contained in the slot. Accordingly, the terminal immediately stops monitoring of the slot at this time, so that consumption of the battery can be suppressed and the time of waiting for a call can be made longer.

DESCRIPTION OF THE PREFERRED EMBODIMENT

Figure 1:
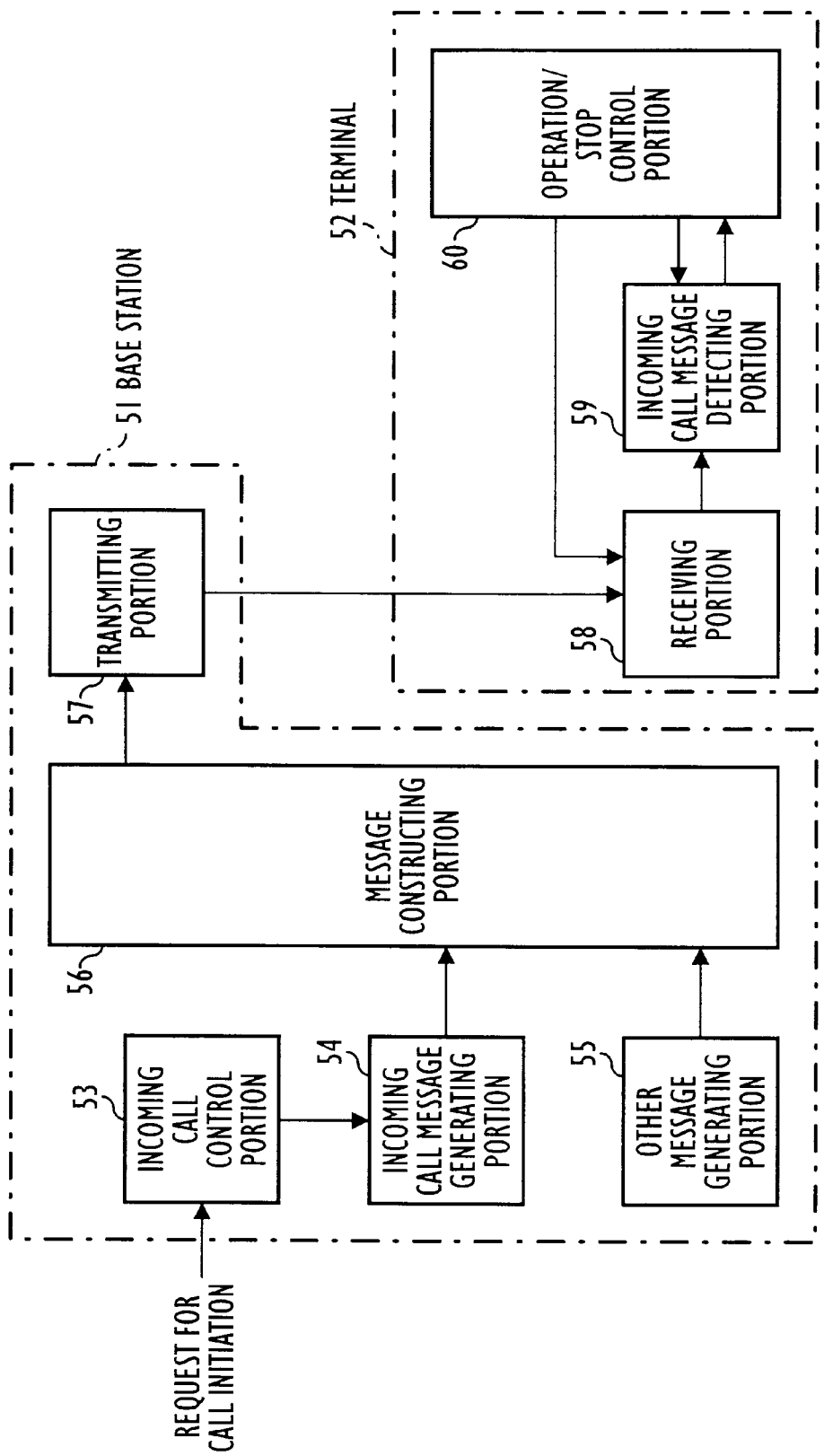
FIG. 1 is a block diagram schematically illustrating a control channel transmitting unit of a base station and a control channel receiving unit of a terminal in the prior art.
Figure 2:
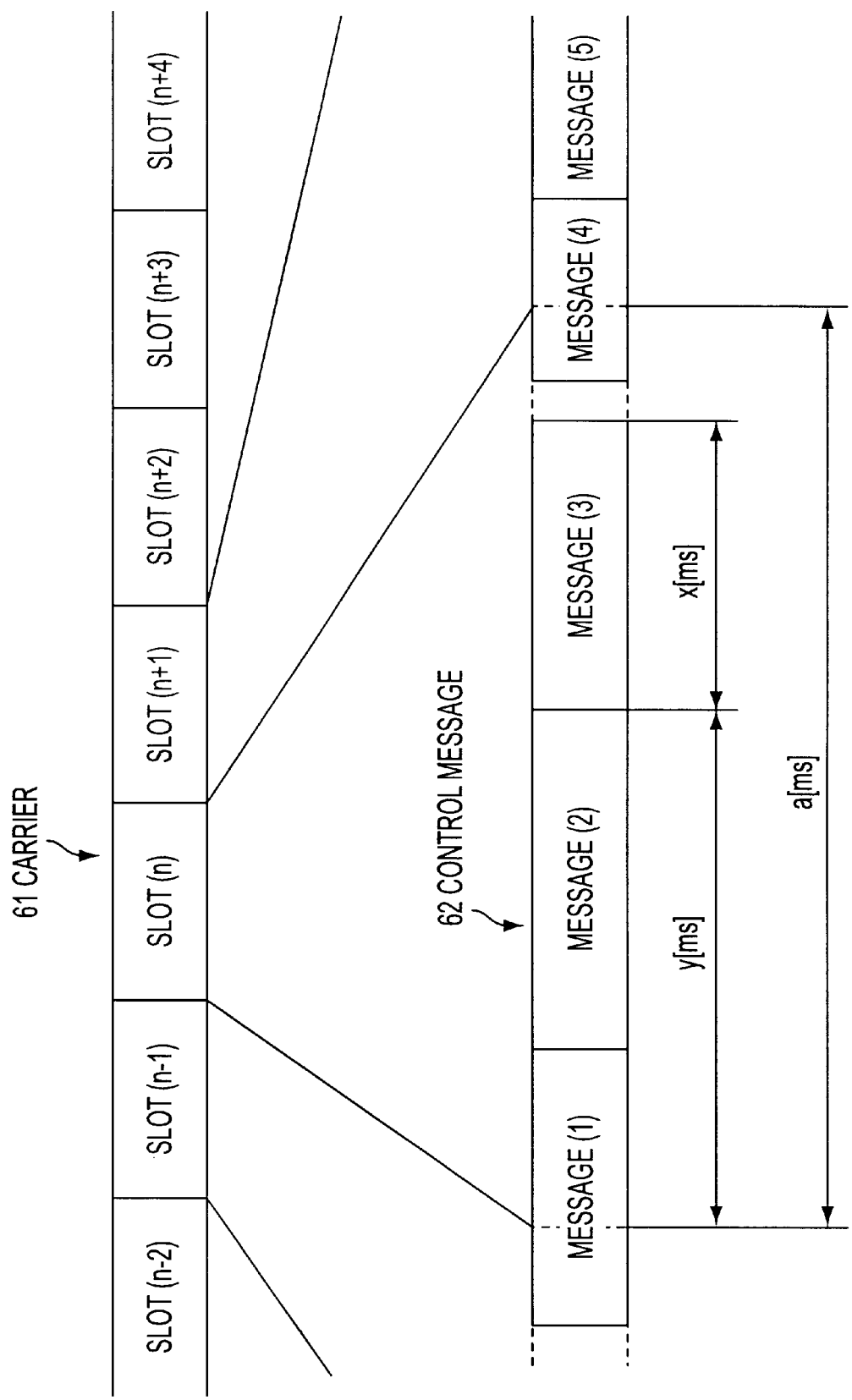
FIG. 2 illustrates the data format of the control channel in the prior art.
Figure 3:
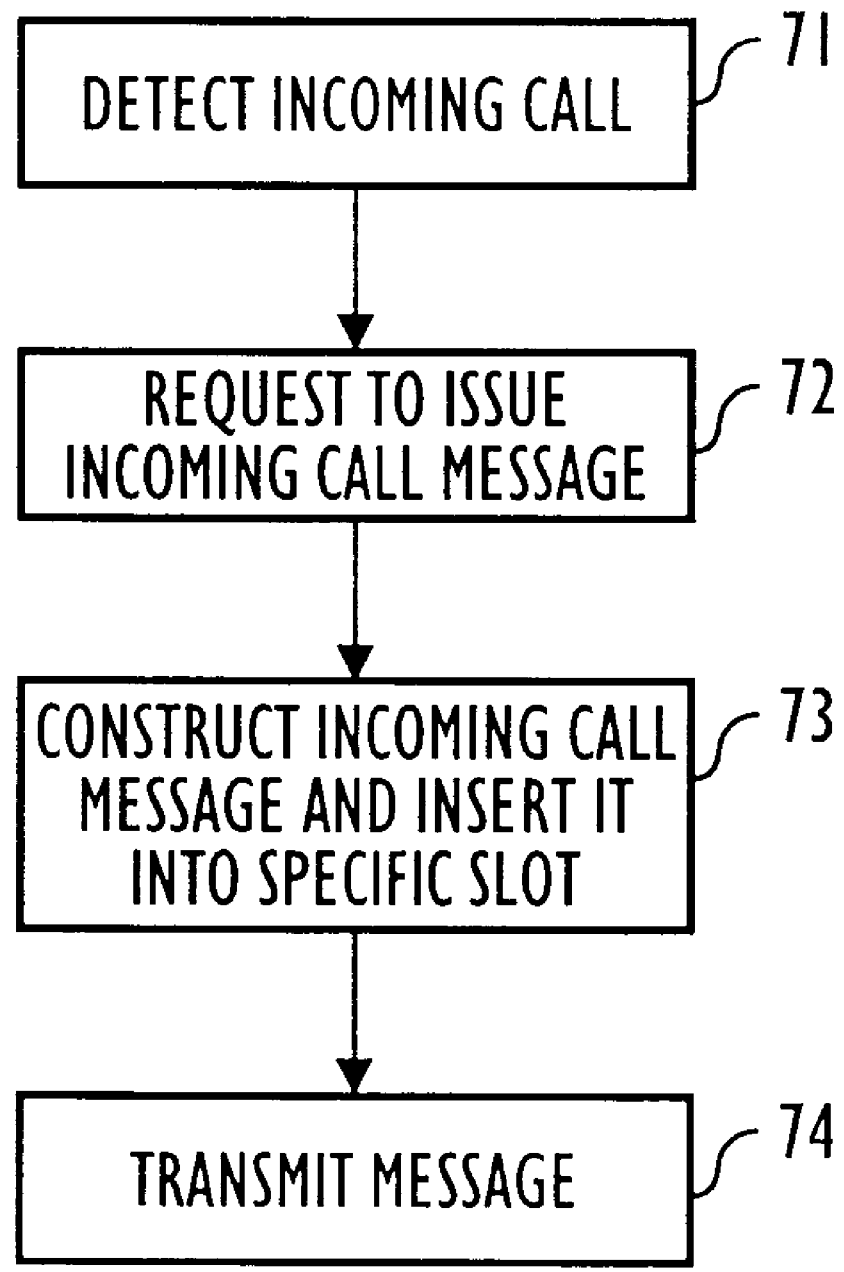
FIG. 3 is a flow chart showing operation of the base station in the prior art.
Figure 4:
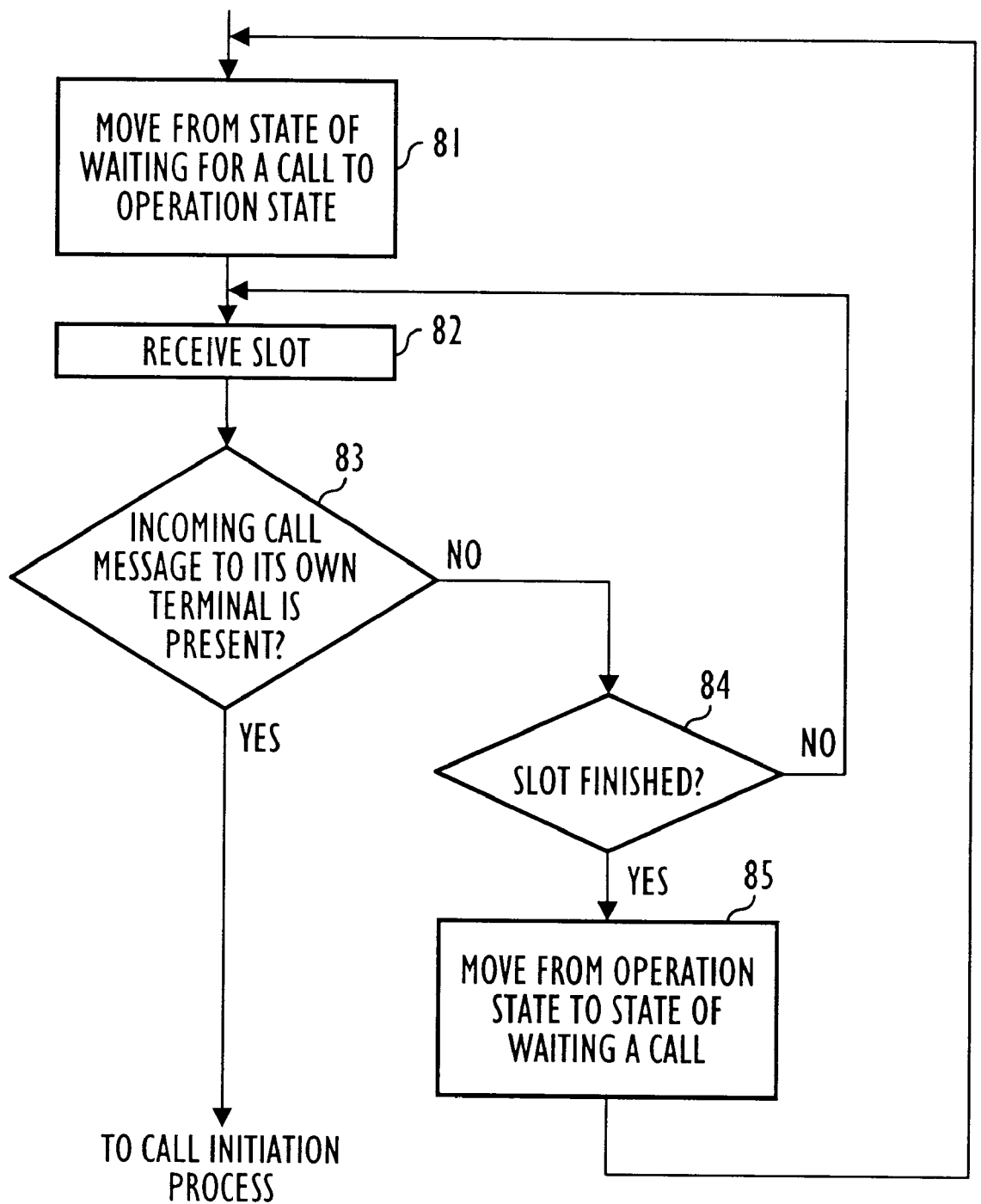
FIG. 4 is a flow chart showing operation of the terminal in the prior art.
Figure 5:
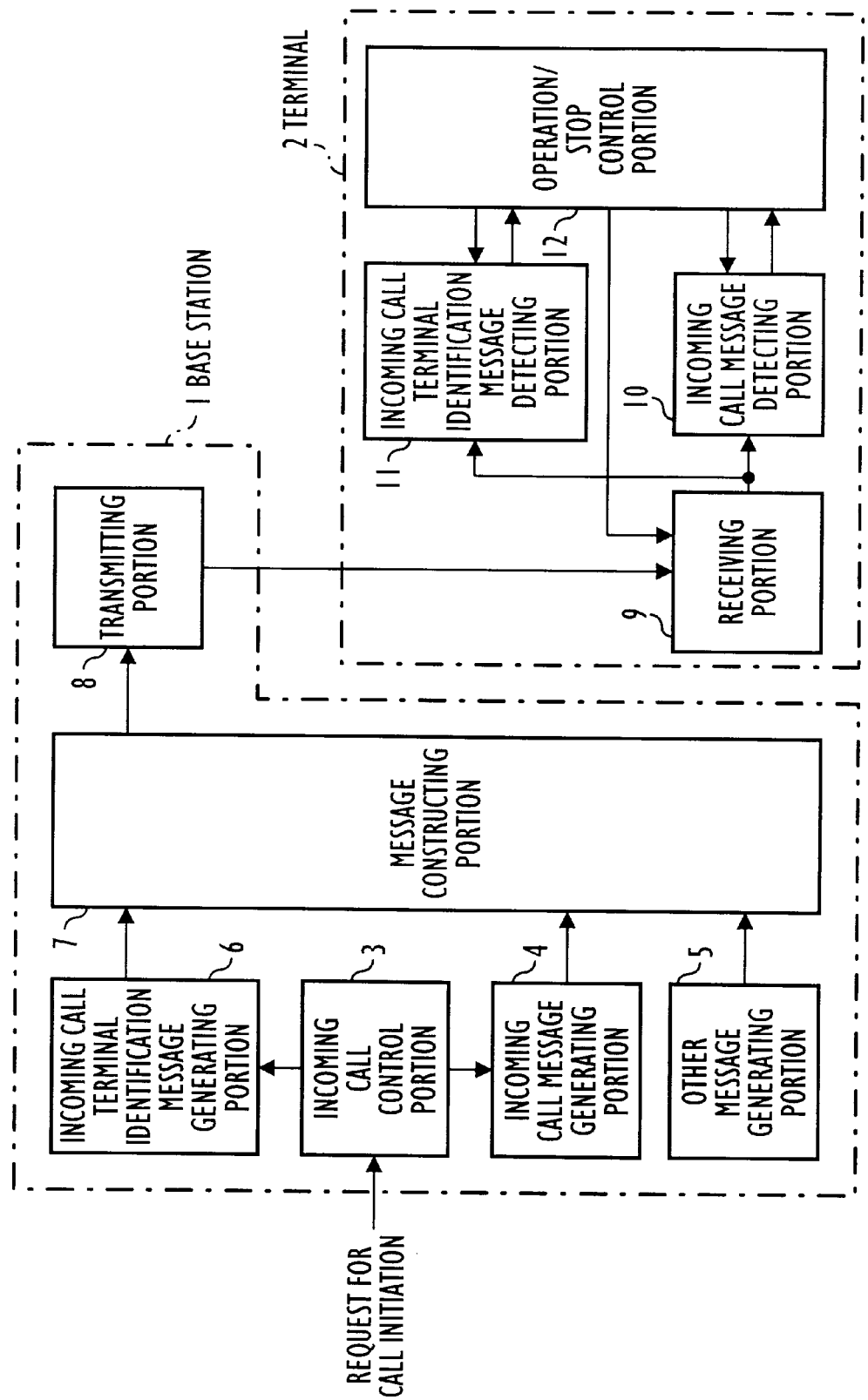
FIG. 5 is a block diagram schematically illustrating a control channel transmitting unit of a base station and a control channel receiving unit of a terminal according to an embodiment of the present invention.

FIG. 5 is a block diagram schematically illustrating a control channel transmitting unit of a base station and a control channel receiving unit of a terminal according to an embodiment of the present invention. In a base station 1, an incoming call control portion 3 detects a request for call initiation from a network. An incoming call message generating portion 4 issues an incoming call message to an incoming call terminal. An other message generating portion 5 generates messages of various kinds of control information indicative of states of the system and the like which are not directly related to the call initiation. An incoming call terminal identification message generating portion 6 generates an incoming call terminal identification message, for example ID number information peculiar to the incoming call terminal. A message constructing portion 7 constructs messages from incoming call message generating portion 4, the other message generating portion 5 and the incoming call terminal identification message generating portion 6 to form a message block. A transmitting portion 8 transmits the constructed message block through radio.

In a terminal 2 which is a mobile station, a receiving portion 9 monitors a slot assigned to its own terminal to receive a radio wave signal from the base station 1. An incoming call message detecting portion 10 takes out an incoming call message from the received slot. An incoming call terminal identification message detecting portion 11 detects whether the incoming call terminal identification message is inserted in the head of the received slot or not. An operation/stop control portion 12 controls to operate and stop each portion of the terminal 2.

Figure 6:
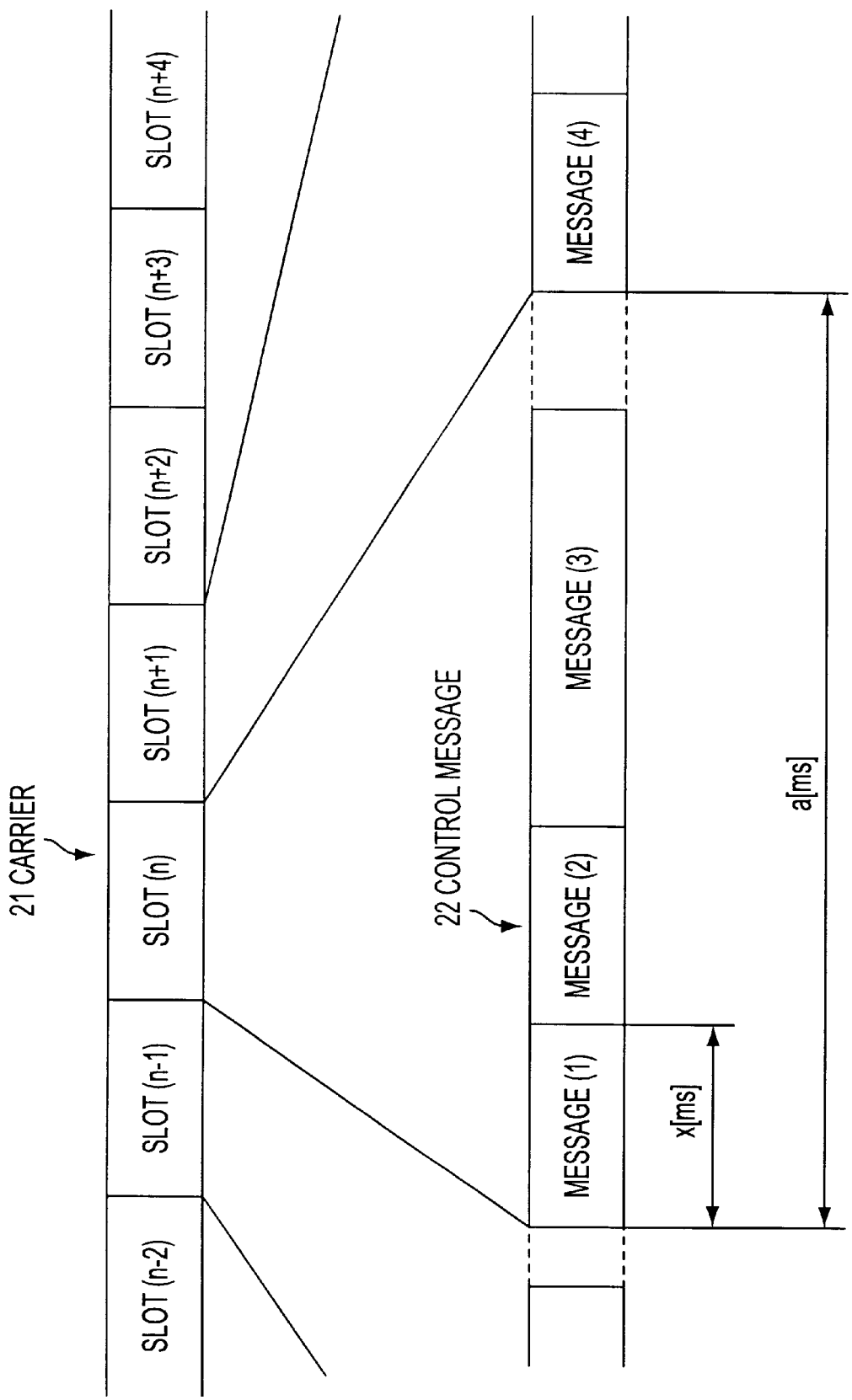
FIG. 6 illustrates the data format of the control channel of the embodiment.

Operation of the embodiment will now be described. Referring to FIG. 6, control data sent from the base station 1 is described. In FIG. 6, a carrier 21 used as a control channel on a radio circuit is divided into slots each having a milliseconds as a unit. A control message 22 provided in the carrier 21 includes a series of various kinds of control information containing the incoming call information sent from the base station 1 and is formed into a message block. An incoming call terminal identification, message such as the ID number peculiar to the terminal, is inserted into a head message (1) of the control message 22 and a regular incoming call signal is inserted into any one of the subsequent messages. Accordingly, the incoming call terminal can understand whether an incoming call message to its own terminal is contained in the slot at this time by only monitoring the message (1), which has a duration of x milliseconds, at the head of the slot.

Figure 7:
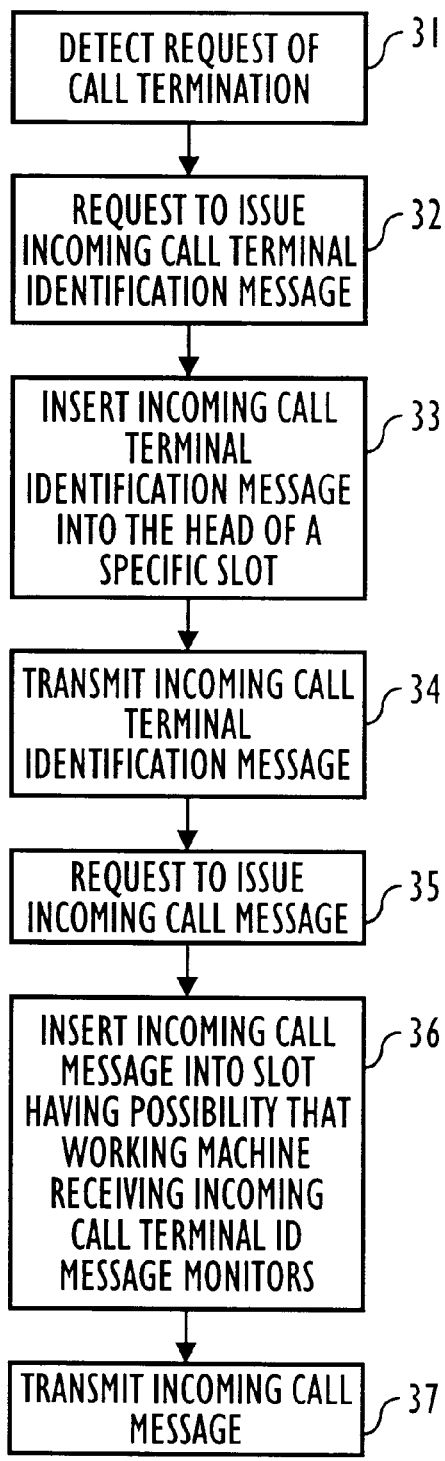
FIG. 7 is a flow chart showing operation of the base station of the embodiment.
Figure 8:
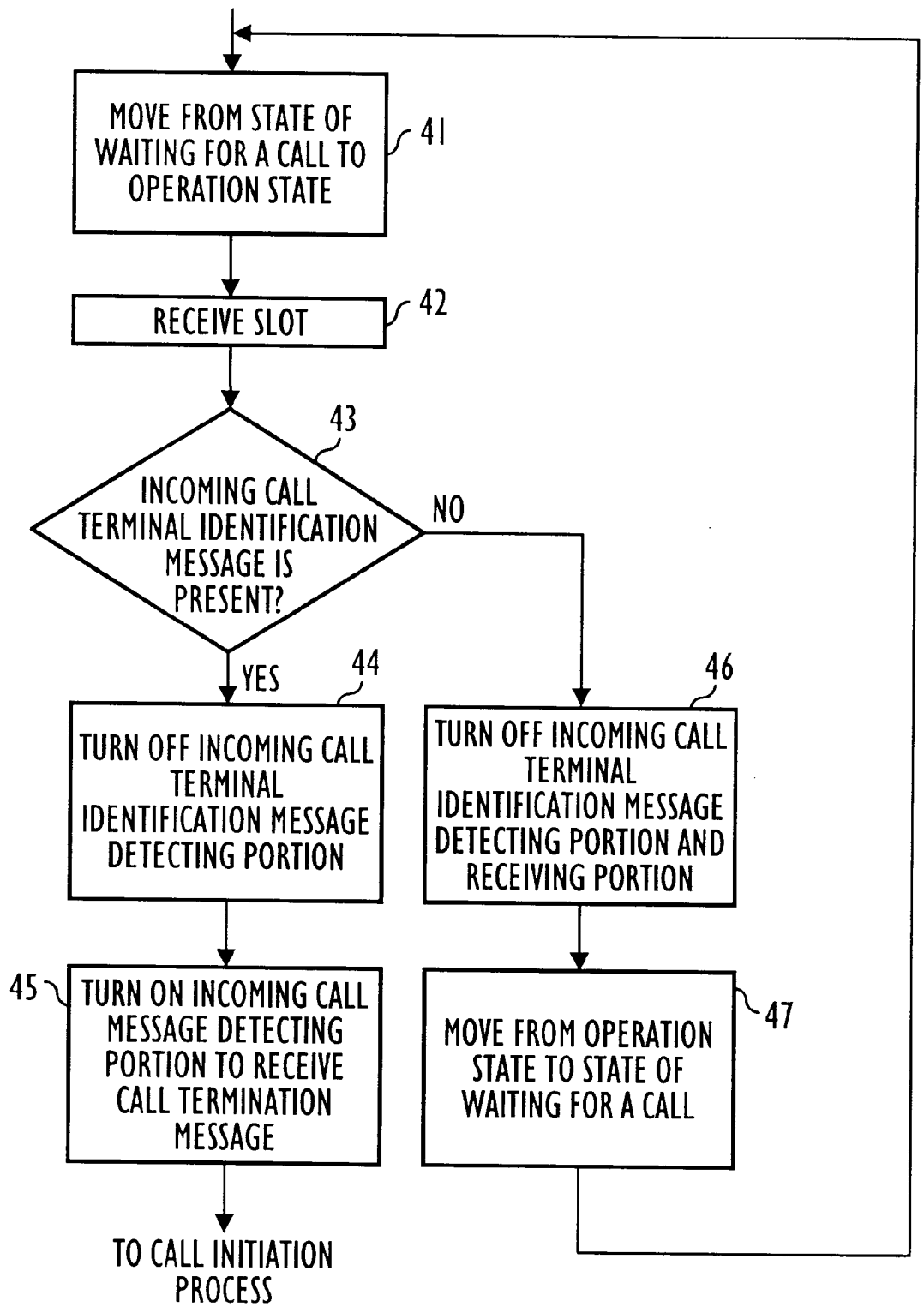
FIG. 8 is a flow chart showing operation of the terminal of the embodiment.

Referring now to FIGS. 7 and 8, operation of the base station 1 and the terminal 2 will be described. As shown in FIG. 7, when the incoming call control portion 3 of the base station 1 detects an incoming call from the network (step 31), the incoming call control portion 3 requests the incoming call terminal identification message generating portion 6 to issue an incoming call terminal identification message (step 32). The incoming call terminal identification message generating portion 6 generates the incoming call terminal identification message in response to the request. The message constructing portion 7 inserts the incoming call terminal identification message received from the portion 6 into the head of a specific slot assigned to the incoming call terminal (step 33). The transmitting portion 8 transmits the incoming call terminal identification message through radio (step 34). The incoming call control portion 3 requests the incoming call message generating portion 4 to issue the incoming call message (step 35). The incoming call message generating portion 4 generates the incoming call message in response to the request. The message constructing portion 7 inserts the incoming call message received from the portion 4 into a slot having the possibility that a working machine which receives the incoming call terminal identification message monitors the slot (step 36). The transmitting portion 8 transmits the incoming call message through radio (step 37).

On the other hand, in the terminal 2, as shown in FIG. 8, the operation/stop control portion 12 operates the receiving portion 9 and the incoming call terminal identification message detecting portion 11 just before the slot to be monitored by its own terminal is reached and moves from the state of waiting for a call to the operational state (step 41). The receiving portion 9 receives the slot assigned to its own terminal (step 42). The incoming call termination identification message detecting portion 11 examines whether the incoming call terminal identification message exists in the head of the slot received by the receiving portion 9 or not (step 43) and sends a signal to the operation/stop control portion 12 if the incoming call terminal identification message exists. When the operation/stop control portion 12 receives the signal, the operation/stop control portion 12 turns off the incoming call terminal identification message detecting portion 11 (step 44) and turns on the incoming call message detecting portion 10 in the state of waiting for a call to cause it to receive the regular incoming call message (step 45). Thereafter, an incoming call process control portion (not shown) performs the call initiation process. The reception of the regular incoming call message is made after the incoming call terminal identification message has been received and its own terminal has understood that it has been called, and accordingly the regular incoming call message is not necessarily required to be received within the slot assigned to its own terminal. In step 43, if an incoming call terminal identification message is not detected, the operation/stop control portion 12 immediately stops operation of the incoming call terminal identification message detecting portion 11 and the receiving portion 9 (step 46) to monitor the slot at this time no longer and stop the monitoring, and moves from the operational state to the state of waiting for a call (step 47).

As described above, according to the embodiment, the base station 1 includes the incoming call terminal identification message generating portion 6 and inserts the incoming call terminal identification message into the head of the slot assigned to the incoming call terminal to transmit it. The terminal 2 detects the incoming call terminal identification message by the detector 11 and when the incoming call terminal identification message is present the terminal 2 receives the regular incoming call message thereafter and performs the call initiation process. When the incoming call terminal identification message is not present, the terminal 2 immediately stops monitoring of the slot at this time to save consumption of the battery, and accordingly the time of waiting for a call can be extended.

According to the present invention, as will be apparent from the embodiment, when the base station is to transmit an incoming call message, the base station inserts the message useful for only the incoming call terminal into the head or the vicinity of the head of the slot assigned to the terminal and transmits it. When the incoming call terminal detects the message, the terminal receives the regular incoming call message transmitted thereafter. When the terminal cannot detect the message, the terminal judges that the message is not directed to call its own terminal and immediately stops monitoring of the slot at this time. Accordingly, consumption of the battery can be suppressed and the time of waiting for a call can be made longer.

What is claimed is:

1. A terminal for use with a base station which communicates by radio with the terminal via a control channel and a speech channel, the control channel having a repeating sequence of time slots, comprising:

a receiving portion to receive messages from the base station over the control channel;

a terminal identification message detecting portion to detect whether the receiving portion has received, from the base station, a terminal identification message inserted at the head of a time slot assigned to the terminal;

an incoming call message detecting portion to detect whether the receiving portion has received an incoming call message transmitted by the base station after the terminal identification message; and control means for selectively turning the portions on and off so as to monitor at least the head of the time slot assigned to the terminal and to stop monitoring the slot assigned to the terminal for the rest of the slot if the terminal identification message is not inserted at the head of the slot assigned to the terminal, wherein the control means comprises means for turning at least the receiving portion and the terminal identification message detecting portion on prior to the slot assigned to the terminal, for turning at least the receiving portion and the terminal identification message detecting portion off if the terminal identification message is not detected at the head of the slot assigned to the terminal, and for ensuring that the incoming call message detecting portion is on if the terminal identification message is detected at the head of the slot assigned to the terminal, and wherein the control means further comprises means for turning the terminal identification message detecting portion off and the incoming call message detecting portion on if the terminal identification message is detected at the head of the slot assigned to the terminal.

2. A terminal accroding to claim 1, wherein the terminal identification message includes an identification number assigned to the terminal.

* * * * *